Patented July 25, 1933

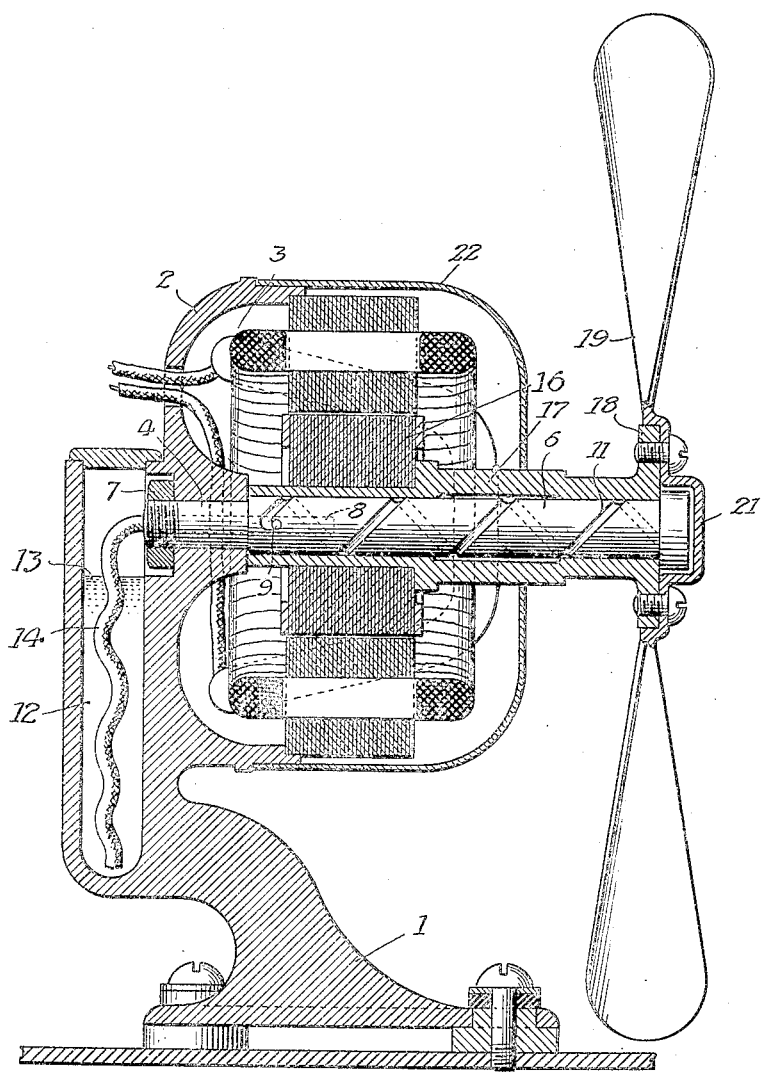

1,919,522

UNITED STATES PATENT OFFICE

CARL E. L. LIPMAN, OF CHICAGO, ILLINOIS, ASSIGNOR TO LIPMAN PATENTS CORPORATION, OF CHICAGO, ILLINOIS, A CORPORATION OF DELAWARE

ELECTRIC MOTOR

Application filed April 21, 1930. Serial No. 445,920.

This invention relates to electric motors and more particularly to the manner of supporting and lubricating the rotating member of the motor.

The manner of rotatably supporting the rotary member of a motor and of lubricating the rotary member has always been a serious problem in motor construction.

It has been customary in the past to mount the rotor upon a shaft and journal, the latter at each end in suitable bearings carried by the base. This type of mounting required that the bearings be perfectly aligned and fitted in order that the rotor would revolve within the stator without contacting therewith and with the proper clearance. It is preferable of course to have the rotor revolving in close proximity to the stator whether the machine be of the alternating or direct current type. In the latter type the stator is the field and the rotor is the armature. If one end bearing wore more than the other, as was frequently the case, the shaft was thrown out of alignment which altered the air gap between the stator and rotor and frequently permitted the rotor to contact with the stator.

It is the purpose of this invention to provide a mounting for the rotating member which will substantially eliminate the above defects.

It is an object therefore of this invention to provide means for supporting the rotor of an electric motor in such a manner that correct alignment is assured and in such a manner as to eliminate undue wear and to provide for proper lubrication.

In accordance with this invention the shaft of the motor instead of being rotatably journalled in end bearings is made the stationary member and the rotor is journalled thereon. The shaft being stationary is relatively fixed and not subject to whipping nor tortional strains as is a rotating shaft. The armature may be mounted directly on the stationary shaft for rotation thereon or it may be mounted upon a sleeve the latter being journalled on the stationary shaft. The sleeve may also serve as the driving medium for whatever work is to be accomplished by the motor.

Means are provided for lubricating the exterior surface of the shaft and also for preventing the lubricating medium from escaping axially of the shaft.

A better understanding of this invention will be had from a consideration of the following description taken in connection with the drawing in which the figure is a vertical central section through a fan motor constructed in accordance with this invention.

In the illustrated embodiment of this invention a fan motor is illustrated although it is obvious that the motor may be utilized to perform any other desired work. The motor is supported upon a pedestal-like base 1 which has cast integrally therewith a support and partial housing 2 which serves to house the stator and stator windings 3, the latter being secured to the support 2 by any desired means. The support is also bored to receive the end shank portion 4 of the stationary stub shaft 6 which is secured rigidly to the support by a nut 7 engaging the threaded end of the shank 4. The shaft is formed with a central longitudinal bore 8 connected by passages 9 to a spiral-like groove 11 extending around the peripheral surface of the shaft.

Cast integrally with the pedestal 1 and support 2 is an oil well 12 for containing a lubricant 13. A wick 14 extends into the lubricant in the well and up into the center bore of the shaft.

The rotor 16 is secured to a sleeve 17 for rotation therewith the latter being substantially the full length of the free projecting end of the shaft and being journalled thereon and retained against longitudinal displacement by any suitable means as, for example, a head or nut at the free end of the stub shaft. The outer end of the sleeve is flanged as at 18 to provide a securing means for the fan blades 19. The center portion 21 of the fan blades is of cap formation and seals the end of the shaft and sleeve to prevent any lubricant from escaping axially of the shaft and sleeve. A casing 22 is provided for inclosing the stator and rotor.

It is obvious that although an AC inductor type motor is illustrated, the electrical construction of the motor is immaterial and may be of any type either for alternating current or direct current.

The operation of the motor previously described is believed to be apparent. It follows from the construction, that is, the provision of a rigid stationary shaft, that it is practically impossible for the shaft to whip or become out of alignment.

It is obvious that minor changes may be made in the details of construction without departing from the spirit and scope of the invention as defined in the claims appended hereto.

I claim:

1. An electric motor comprising a support, a stator carried thereby, a stub shaft fixed at one end to said support and projecting therefrom, a sleeve journalled on said shaft, a rotor carried by said sleeve in cooperative relation to said stator, means for preventing longitudinal displacement of said sleeve relatively to said shaft, means for delivering lubricant between the shaft and the sleeve, and means for preventing the escape of lubricant so delivered at the free end of said shaft.

2. An electric motor comprising a support, a stator carried thereby, a stub shaft fixed at one end to said support and projecting therefrom, a sleeve journalled on said shaft, a rotor carried by said sleeve in cooperative relation to said stator, said shaft having means on its projecting end for preventing longitudinal displacement of said sleeve relatively to said shaft, means for delivering lubricant between the shaft and the sleeve, and means for preventing the escape of lubricant so delivered at the free end of said shaft.

3. An electric motor comprising a support, a stator carried thereby, a stub shaft fixed at one end to said support and projecting therefrom, a sleeve journalled on said shaft, a rotor carried by said sleeve in cooperative relation to said stator, means for preventing longitudinal displacement of said sleeve relatively to said shaft, means for delivering lubricant between the shaft and the sleeve, and a cap secured to the end of said sleeve to prevent the escape of lubricant so delivered at the projecting end of said shaft.

CARL E. L. LIPMAN.